US007682406B2

(12) United States Patent
Käser et al.

(10) Patent No.: US 7,682,406 B2
(45) Date of Patent: Mar. 23, 2010

(54) DISAZO DYES AND DYE COMPOSITIONS FOR SHADING WHITE PAPER

(75) Inventors: Adolf Käser, Bottmingen (CH); Wolfgang Schlenker, Aesch (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 104 days.

(21) Appl. No.: 11/922,451

(22) PCT Filed: Jun. 26, 2006

(86) PCT No.: PCT/EP2006/063537

§ 371 (c)(1), (2), (4) Date: Dec. 17, 2007

(87) PCT Pub. No.: WO2007/003524

PCT Pub. Date: Jan. 11, 2007

(65) Prior Publication Data

US 2009/0083913 A1 Apr. 2, 2009

(30) Foreign Application Priority Data

Jul. 4, 2005 (EP) ................................. 05106045

(51) Int. Cl.
- C09B 67/00 (2006.01)
- C09B 45/00 (2006.01)
- C09B 31/08 (2006.01)
- C09B 41/00 (2006.01)

(52) U.S. Cl. .................... 8/641; 8/681; 8/687; 534/579

(58) Field of Classification Search ............. 8/696, 8/641, 681, 687; 534/579
See application file for complete search history.

(56) References Cited

U.S. PATENT DOCUMENTS

| 5,559,217 | A | * | 9/1996 | Kaser | 534/828 |
| 6,084,078 | A | * | 7/2000 | Mennicke | 534/670 |
| 6,635,092 | B2 | * | 10/2003 | Kaser et al. | 8/641 |
| 2009/0105108 | A1 | * | 4/2009 | Hohener et al. | 510/303 |

FOREIGN PATENT DOCUMENTS

| EP | 1 024 178 | 8/2000 |
| GB | 318891 | 11/1930 |

* cited by examiner

*Primary Examiner*—Lorna M Douyon
*Assistant Examiner*—Tanisha Diggs
(74) *Attorney, Agent, or Firm*—Shiela A. Loggins

(57) ABSTRACT

The invention relates to novel dyes of the formula (1) in which D represents a phenyl or naphthalene residue which is substituted by one or two sulphonic Acid or carboxylic acid groups and, optionally, by one or two groups selected from $C_1$-$C_4$alkyl, hydroxyl and nitro, each $R_1$ and $R_2$, independently, represent hydrogen or, a $C_1$-$C_4$alkyl group, $R'_1$ represents hydrogen, hydroxyl, $C_1$-$C_4$alkyl or $C_1$-$C_4$hydroxyalkyl, $R_3$ represents hydrogen, $C_1$-$C_4$alkyl or phenyl, which is unsubstituted or substituted by one or two groups selected from $C_1$-$C_4$alkyl, $C_1$-$C_4$alkoxy, halogen, hydroxyl, —$NH_2$, nitro, —$SO_3M$ and —$CO_2M$ and M represents hydrogen, an alkaline or alkaline earth metal, ammonium or ammonium that is mono-, di-, tri- or tetrasubstituted by $C_1$-$C_4$alkyl or $C_2$-$C_4$hydroxyalkyl or a polyglycolammonium cation and also known dyes of formula (5), in which D' represents a phenyl or naphthalene residue which is substituted by one or two sulphonic acid or carboxylic acid groups and, optionally, by one or two groups selected from $C_1$-$C_4$alkyl and $C_1$-$C_4$alkoxy and $R_3$ and M are as defined above, and their mixtures suitable for shading white paper, a process for shading, a process for the preparation of the novel dyes and white paper which has been treated with such shading components.

12 Claims, No Drawings

DISAZO DYES AND DYE COMPOSITIONS FOR SHADING WHITE PAPER

The present invention relates to dyes and their mixtures suitable for shading white paper, a process for shading, a process for the preparation of the novel dyes and white paper which has been treated with such shading components.

For the production of white paper, two approaches, which may also complement each other, are available to the papermaker, namely addition of small quantities of violet shading dyes and the use of fluorescent whitening agents. The relative advantages and disadvantages of these two approaches are discussed in detail in WO 02/18705, as are the requirements of suitable shading dyes, as defined by their relative hue angles.

As an ideal single shading dye from the point of view of hue angle, C.I. Direct Violet 9 has been recognized to fulfill the requirements, but suffers from problems regarding water solubility of, for example, its sodium salt, especially in hard water. Introduction of further sulphonic acid groups into the molecular overcomes solubility problems, but leads to products lacking affinity to the cellulose fibres.

One attempt to overcome this problem has been disclosed in EP 1 024 178, whereby mixtures of bluish violet or reddish blue anionic dyes together with certain red anionic dyes are disclosed as shading components. Despite the fact that surprisingly good results are obtained with regard to brightness, a problem normally associated with addition of red dyes, of the shaded papers, one further problem still remains.

Both in the case of C.I. Direct Violet 9 and in the case of shading dye mixtures disclosed in EP 1 024 178, the central building block for the synthesis is a so-called "MAK III" amine. MAK III amines belong to a list of aromatic amines such as cresidine or dianisidine, the carcinogenic activity of which has been clearly demonstrated. Thus, potential dangers exist both during the preparation of such products and also, conceivably, in the production of dangerous degradation products. Thus far, however, it has been necessary to employ such building blocks in order to produce dyes of the shade necessary to fulfill the strict spectral requirements of shading dyes.

It has now surprisingly been found that a certain classes of violet dyes, not based on MAK II amines, and also their mixtures, are capable of fulfilling the strict requirements of shading dyes in the production of white paper.

Consequently, in a first aspect, the invention relates to a compound of the formula

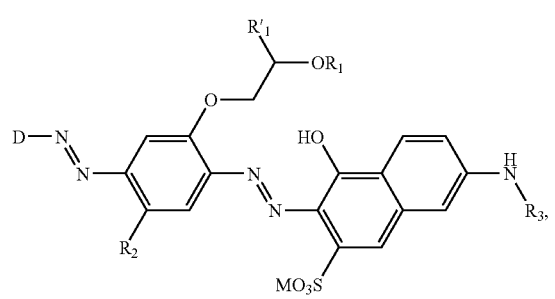

(1)

in which

D represents a phenyl or naphthalene residue which is substituted by one or two sulphonic acid or carboxylic acid groups and, optionally, by one or two groups selected from $C_1$-$C_4$alkyl, hydroxyl and nitro, each $R_1$ and $R_2$, independently, represent hydrogen or, a $C_1$-$C_4$alkyl group, $R'_1$ represents hydrogen, hydroxyl, $C_1$-$C_4$alkyl or $C_1$-$C_4$hydroxyalkyl, $R_3$ represents hydrogen, $C_1$-$C_4$alkyl or phenyl, which is unsubstituted or substituted by one or two groups selected from $C_1$-$C_4$alkyl, $C_1$-$C_4$alkoxy, halogen, hydroxyl, —$NH_2$, nitro, —$SO_3M$ and —$CO_2M$ and M represents hydrogen, an alkaline or alkaline earth metal, ammonium or ammonium that is mono-, di-, tri- or tetra-substituted by $C_1$-$C_4$alkyl or $C_2$-$C_4$hydroxyalkyl or a polyglycolammonium cation.

Preferably, in the compound of formula (1) D represents a phenyl monosulphonic acid residue, which is unsubstituted or substituted by one or two methyl groups or a nitro group, a phenyl disulphonic acid residue, especially a 2,4- or 2,5-disulphonic acid residue, a salicylic acid residue or a naphthalene mono- or disulphonic acid residue, especially a 2-naphthyl-6,8- or 4,8-disulphonic acid residue.

Furthermore, in the compound of formula (1), $R_1$ preferably represents hydrogen or methyl, especially hydrogen, $R'_1$ represents hydrogen, methyl or hydroxymethyl, especially hydrogen, $R_2$ represents hydrogen or methyl, especially methyl and $R_3$ represents hydrogen, phenyl or an amino phenyl sulphonic acid residue, whilst M is preferably hydrogen, sodium, lithium, a mono-, di- or triethanolammonium or a polyglycolammonium salt.

Within the scope of the definitions of the substituents in the compound of formula (1), $C_1$-$C_4$alkyl radicals are branched or unbranched and are, for example, methyl, ethyl, propyl, isopropyl or n- sec- or tert-butyl. $C_1$-$C_4$alkoxy is, for example, methoxy, ethoxy, propoxy, isopropoxy or n-butoxy whilst $C_2$-$C_4$hydroxyalkyl is, for example, hydroxyethyl, hydroxypropyl or hydroxybutyl and halogen is fluorine, bromine or, especially chlorine.

The novel compounds of formula (1) of the invention may be prepared by standard diazotization and coupling procedures well known in dyestuff chemistry.

Consequently, in a second aspect, the invention relates to a process for the preparation of the compound of formula (1), characterized in that a compound of formula D-$NH_2$ is diazotised and coupled with a compound of formula

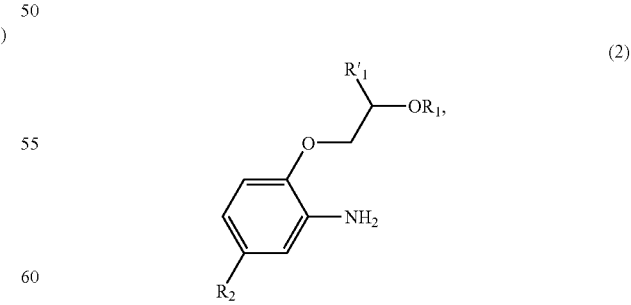

(2)

the pH of the reaction mixture being maintained at between 3.0 and 4.0 by addition of a suitable base such as an alkali metal hydroxide or carbonate, for example, sodium hydroxide, to yield a compound of the formula

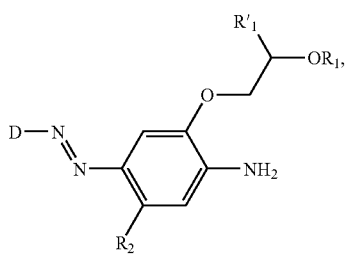

(3)

which is subsequently diazotised and coupled with a compound of the formula

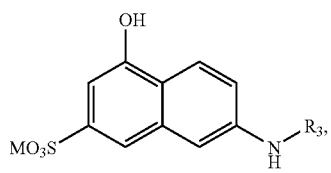

(4)

whereby the pH of the reaction mixture is maintained at between 9.0 and 10.0 by addition of a suitable base such as an alkali metal hydroxide or carbonate, for example, sodium hydroxide, in which D, $R_1$, $R'_1$, $R_2$, $R_3$ and M are as previously defined.

Since the resulting dyes exhibit relative hue angles within the range of from 270 to 300°, they are eminently suitable for use as shading dyes, either alone or together with fluorescent whitening agents, for shading white paper.

Consequently, a further aspect of the invention is a process for shading white paper, characterized in that the paper is treated with an amount of between 0.00005 and 0.005%, based on the weight of dried paper, of at least one compound of formula (1) according to the invention.

However, a further class of related known dyes or dyes which can be prepared by known methods, analogous to the process for the preparation of the compounds of formula (1), also exhibit similar desirable relative hue angles of between 270 to 300°. Thus, a still further aspect of the invention is a process for shading white paper, characterized in that the paper is treated with an amount of between 0.00005 and 0.005%, based on the weight of dried paper, of at least one compound of formula

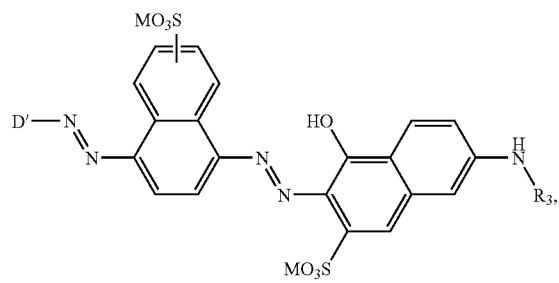

(5)

in which

D' represents a phenyl or naphthalene residue which is substituted by one or two sulphonic acid or carboxylic acid groups and, optionally, by one or two groups selected from $C_1$-$C_4$alkyl and $C_1$-$C_4$alkoxy and $R_3$ and M are as previously defined for the compound of formula (1).

In a preferred aspect the invention further relates to a process for shading white paper, characterized in that the paper is treated with an amount of between 0.00005 and 0.005%, based on the weight of dried paper, of a mixture of the compounds of formula

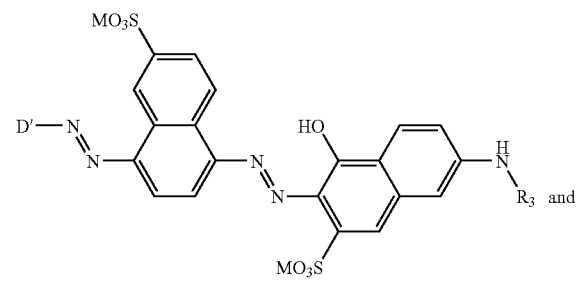

(6)

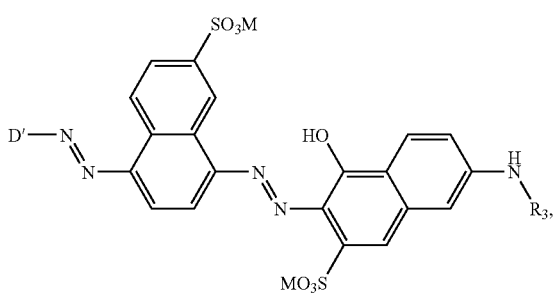

(7)

in which

D', $R_3$ and M are as previously defined.

In order to a achieve a particularly desirable relative hue angle, for example of between 280 and 295°, it may be necessary to employ mixtures, not only of compounds of formula (5), such as (6) and (7), but also mixtures of one or more compounds of formula (1) with one or more compounds of formula (5).

Consequently, in a still further aspect, the invention relates to a process for shading white paper, characterized in that the paper is treated with an amount of between 0.00005 and 0.005%, based on the weight of dried paper, of a mixture comprising at least one compound of formula (1) together with at least one compound of formula (5), whereby the relative ratios of the individual components are such as to result in a hue angle of between 270 and 300°, preferably of between 280 and 295°.

The ratios of the individual components may vary over a wide range depending upon the relative hue angles of the individual components and upon the relative hue angle desired. Thus, for example, the ratios may vary from 99% of compounds of formula (1) to 1% of compounds of formula (5) up to and including from 1% of compounds of formula (1) to 99% of compounds of formula (5), whereby a ratio of approximately 50% of compounds of formula (1) to 50% of compounds of formula (5) is preferred.

Such mixtures may be prepared by simply mechanical mixing of the individual components or directly from the synthesis. In this latter case, preparation is performed in analogy to the process described above for preparation of compounds of formula (1), but, in the first coupling reaction, employing a mixture of the coupling component of formula (3) together with the appropriate amino naphthalene sulphonic acid derivative or alternatively by employing a mixture of amines of formula $D-NH_2$ and $D'-NH_2$, whereby D and D' are as defined above for compounds (1) and (5) respectively, which, after diazotization, are coupled to a compound of formula (3).

The use of dye mixtures enables not only an optimization of relative hue angle, but also is useful for achieving an optimum in affinity to the cellulose fibre whilst ensuring sufficient water solubility by varying the number of sulphonic acid groups in the respective molecules. Thus it is preferable to attain an average of at least 2 sulphonic acid groups per dye molecule, the optimum lying within the range of an average of between 2.3 and 3.5 sulphonic acid groups per dye molecule.

The dyes and mixtures of dyes disclosed in the invention are particularly useful for shading white paper, especially white paper containing fluorescent whitening agents. They are preferably used as a solid or liquid commercial form.

The pulverulent or granular form of the dye can be used particularly in batch wise pulp dyeing where the dye mixture, customarily in the form of a stock solution, is added in the pulper, in the beater or in the mixing chest. Preference is here given to using dye preparations which as well as the dye, may further include extenders, for example urea as solubilizer, dextrin, Glauber salt, sodium chloride and also dispersants, dust proofing agents and sequestrants, such as polyphosphates.

The present invention accordingly further provides a solid dye composition for shading white paper, comprising at least one compound of formula (1), at least one compound of formula (5), or a mixture of at least one compound of formula 1 together with at least one compound of formula 5 and, optionally, further auxiliaries.

The present invention further provides an aqueous solution for shading white paper, comprising at least one compound of formula (1), at least one compound of formula (5) or a mixture of at least one compound of formula 1 together with at least one compound of formula 5 and, optionally, further auxiliaries, preferably in a concentration of from 5 to 30% by weight. Due to their excellent solubility in water, the dyes of formula (1), formula (5) and, especially, their mixtures are particularly suitable for the preparation of such solutions.

The concentrated solutions preferably contain a low level of inorganic salts, which may be achieved, if necessary, by known methods, for example reverse osmosis.

The solutions may include further auxiliaries, for example solubilizers such as ε-caprolactam or urea, organic solvents, for example glycols, polyethylene glycols, dimethyl sulphoxide, N-methylpyrrolidone, acetamide, alkanolamines or polyglycolamines, which is a still further aspect of the invention.

In a still further aspect, the invention thus relates to the use of a solid dye composition or an aqueous solution, as disclosed above, for shading white paper and also white paper which has been shaded by a process according to the invention.

The hue, which a given quantity of a particular shading dye imparts to the substrate, is not only dependent upon the dye itself, but also upon the natural shade of the substrate. Thus, in order to describe the optical properties of a shading dye independent of the substrate to which it is applied, the hue angle of the appropriate dye or dye mixture, $h_{Dye}$, is calculated from the change of colour coordinates $(a^*-a^*_0)$ and $(b^*-b^*_0)$ in the CIELab colour coordinate system, whereby $a^*_0$ and $b^*_0$ are the colour coordinates of the substrate before shading, using the relationship $$h_{Dye} = \arctan\left(\frac{b^* - b^*_0}{a^* - a^*_0}\right)$$

The following examples serve to illustrate the invention without intending to be restrictive in nature. Parts and percentages are by weight unless otherwise stated.

A. PREPARATIVE EXAMPLES

Example 1

17.2 parts of aniline-4-sulphonic acid are dissolved in a mixture of 150 parts of water and 25 parts of 4N aqueous sodium hydroxide solution and the solution acidified by addition of 26 parts of 32% aqueous hydrochloric acid. The resulting suspension is cooled and diazotized by dropwise addition of 25 parts of 4N aqueous sodium nitrite solution at a temperature of 10° C. The diazonium salt solution is then added dropwise over 30 minutes at 10° C. to a solution containing 16.7 parts of 2-(2'-hydroxyethoxy)-5-methyl aniline in 100 parts of water and 25 parts of 4N aqueous hydrochloric acid, whereby the pH is maintained at 3-4 by addition of 4N aqueous sodium hydroxide solution. After the diazonium salt can no longer be detected, the pH is adjusted to 1-2 by addition of a little 32% aqueous hydrochloric acid and the precipitated solids separated by filtration.

The moist filter cake is slurried in 150 parts of water, 24 parts of 4N aqueous sodium hydroxide solution and 0.6 parts of lignin sulphonate $C_{12}$. After addition of 26 parts of 4N aqueous sodium nitrite solution, the slurry is transferred into a vessel containing 25 parts of ice and 50 parts of water under vigorous stirring. The temperature rises to 30° C. and stirring is then continued for 2 hours at 35° C. to complete diazotization.

The resulting diazonium salt suspension is then added during 30 minutes with cooling to a solution of 36 parts of 1-hydroxy-6-anilinonaphthalene-3-sulphonic acid in 150 parts of water and 30 parts of 4N aqueous sodium hydroxide solution, whereby the pH is maintained at between 9.0 and 9.2 by addition of 4N aqueous sodium hydroxide solution and the temperature maintained at 20° C. by external cooling. After the coupling reaction is complete, the pH is adjusted to 11 by addition of 4N aqueous sodium hydroxide solution and the product precipitated by addition of 12.5% aqueous sodium chloride solution. The precipitated solids are filtered and there are obtained 120 g of filter cake containing the dye of formula

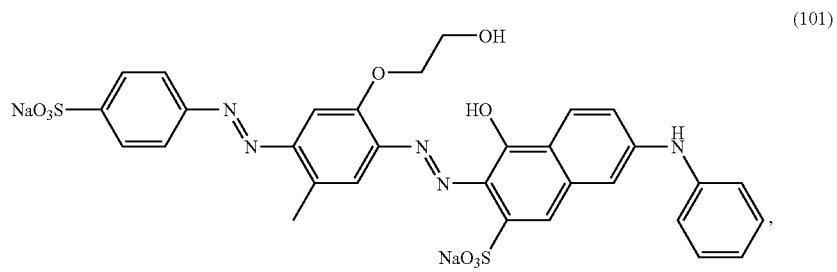

(101)

which after being subjected to dialysis to remove inorganic salts, may be directly converted to an appropriate liquid formulation.

Examples 2-17

By proceeding in an analogous manner to that described in Example 1, but employing appropriate amines in the first diazotization step and appropriate coupling components in the final step, the dyes of general formula 8, which are summarized in the following Table 1, are obtained:

TABLE 1

(8)

| Example No. | Compound No. | D | $R_3$ |
|---|---|---|---|
| 2 | (102) | 3-NaO$_3$S-C$_6$H$_4$- (with methyl) | 2-H$_2$N, 4-methyl-phenyl with NaO$_3$S |
| 3 | (103) | 2-SO$_3$Na, methyl-phenyl | phenyl |
| 4 | (104) | H$_3$C-, SO$_3$Na-phenyl | phenyl |
| 5 | (105) | NaO$_3$S-, CH$_3$-phenyl | phenyl |

TABLE 1-continued
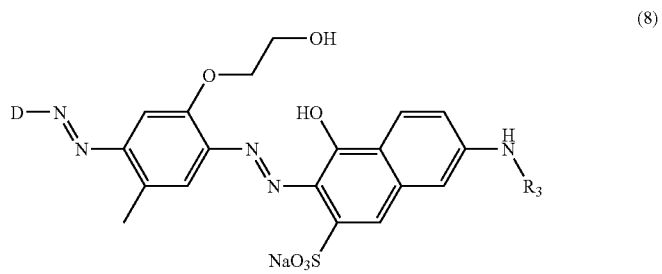
(8)
| Example No. | Compound No. | D | R₃ |
|---|---|---|---|
| 6 | (106) | 2,5-dimethylbenzene with SO₃Na | phenyl |
| 7 | (107) | 3,4-dimethylbenzene with SO₃Na | phenyl |
| 8 | (108) | 2,5-dimethylbenzene with SO₃Na (ortho) | phenyl |
| 9 | (109) | 7-methylnaphthalene-1,3-disulfonate | phenyl |
| 10 | (110) | 4-methylbenzene-1,3-disulfonate | phenyl |
| 11 | (111) | 3-methylnaphthalene-1,5-disulfonate | phenyl |
| 12 | (112) | 3-methylbenzene-1,4-disulfonate | phenyl |

TABLE 1-continued

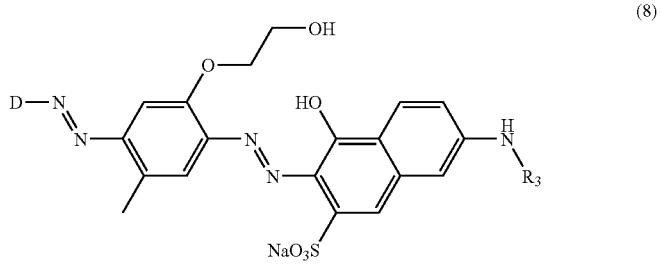

(8)

| Example No. | Compound No. | D | R₃ |
|---|---|---|---|
| 13 | (113) | NaO₃S—⟨phenyl⟩—CH₃ | 2-amino-5-methyl-benzenesulfonate (NaO₃S, H₂N, CH₃) |
| 14 | (114) | 5-methylsalicylate sodium (HO, CO-ONa, CH₃) | H |
| 15 | (115) | 3-methyl-4,8-disulfonaphthalene (NaO₃S ... NaO₃S) | H |
| 16 | (116) | 7-methyl-1,3-disulfonaphthalene (NaO₃S ... NaO₃S) | H |
| 17 | (117) | 2-methyl-3-sulfo-5-nitrobenzene (O₂N⁺, SO₃Na, CH₃) | H |

Dyes with similar colouristic properties to those in the above Table 1 may also be obtained by replacing the 2-(2'-hydroxyethoxy)-5-methyl aniline in Example 1 by an equivalent quantity of the following aniline derivatives, (200)-(500), as collated in the following Table 2:

TABLE 2

(200)

TABLE 2-continued (300)

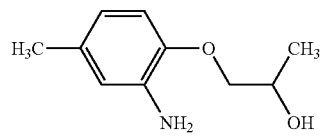

TABLE 2-continued (400)

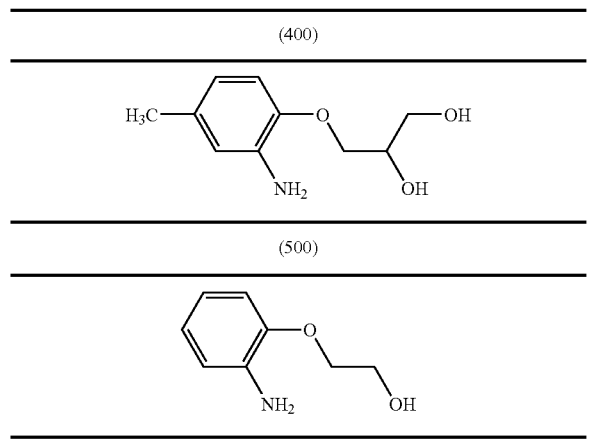

(500)

Examples 18-27

By following the procedure of Example 1, but replacing the 2-(2'-hydroxyethoxy)-5-methyl aniline by an equivalent quantity of 2-aminonaphthalene-7-sulphonic acid and employing the appropriate aniline derivatives D'-NH$_2$ in the first step and the appropriate coupling components (2-hydroxy-6 amino-substituted-naphthalene-3-sulphonic acid derivatives), the following compounds of general formula (9) are obtained, as summarized in the following Table 3:

TABLE 3

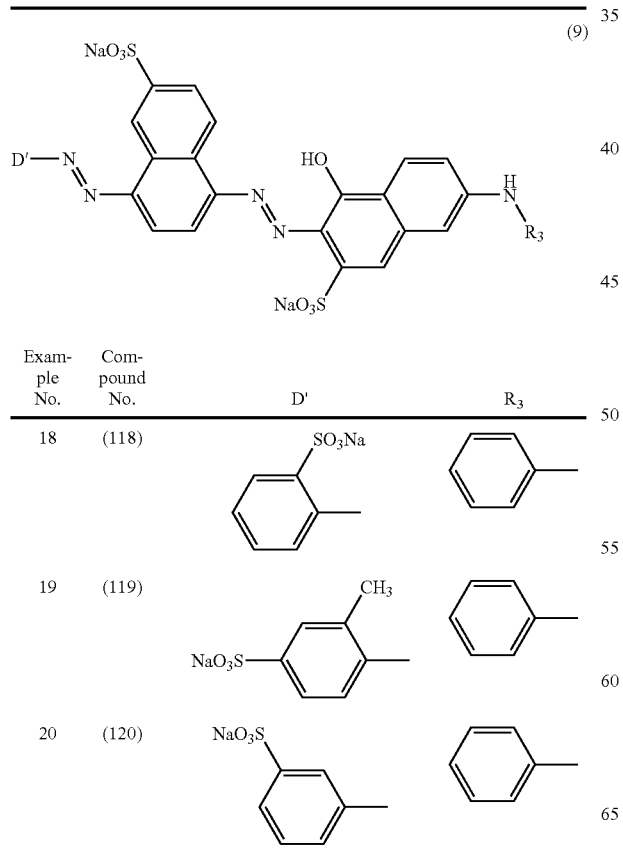

TABLE 3-continued

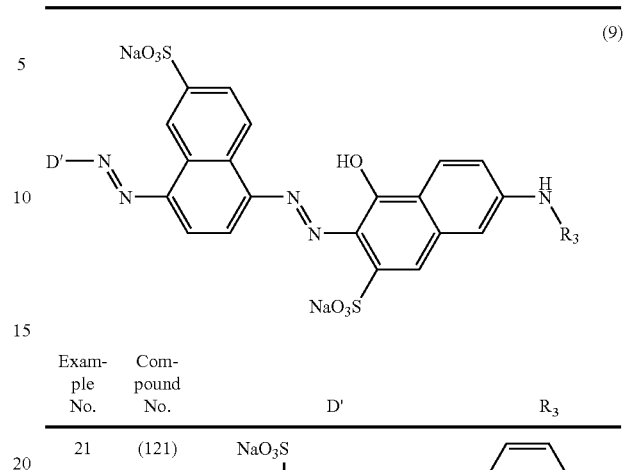

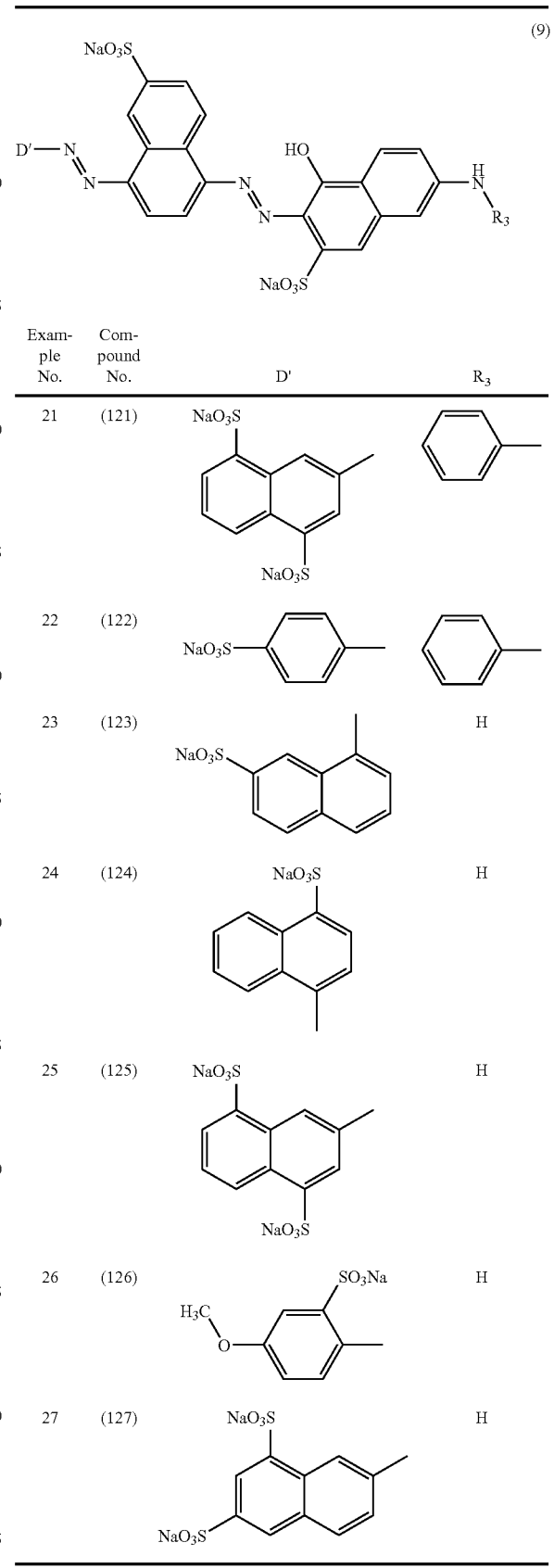

Example 28

A mixture consisting of 18.0 g of aniline 3-sulphonic acid and 31.6 g of 2-naphthylamine-4,8-disulphonic acid is diazotized and then coupled with 33.4 g of 2-(2-hydroxyethoxy)-5-methyl aniline, according to the procedure of Example 1.

The mixture of amino-substituted monoazo dyes is filtered at 5° C. and then diazotized and coupled with 65.5 g of 1-hydroxy-6-anilinonaphthalene-3-sulphonic acid, as described in Example 1. However, during the coupling reaction, the pH is maintained at 6.5 by addition of a total of 80 g of Desmophen™ VP PU 1613 (a poyglycolamine available from Bayer AG). The resulting suspension is diluted to 800 g with water and the pH adjusted to 5.5 by addition of 32% aqueous hydrochloric acid. The mixture is then desalinated through an AFC™30 membrane operating at a pressure of 200 kPa and a temperature of 40-50° C., maintaining a constant volume and washing with a 5-fold quantity of water. After concentrating to 500 g, the pH is adjusted to 7 by addition of 20 g of Desmophen™ VP PU1613 and the solution stabilized by addition of 0.75 g of Proxel™ GXL (a biocide available from Zeneca AG). There is obtained a concentrated, storage stable solution containing a mixture of dyes of formulae (128) and (111), in the form of their desmophenium salts (DM represent the polyglyolamino residue derived from Desmophen™ VP PU1613).

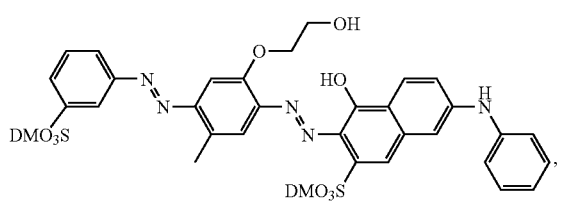

(128)

B. APPLICATION EXAMPLES

General Shading Procedure

To 10 parts of a fibre mixture consisting of 30% sulphate long fibre and 70% of sulphate short fibre (bleached), which had previously been beaten to a Schopper-Riegler fineness of 35° and subsequently dewatered, in 470 parts of tap water (10-15° German hardness), 1.2 parts of calcium carbonate are added and the mixture dispersed for 1 hour.

After this time, sufficient of the appropriate dye or mixture of dyes are added to result in a final degree of whiteness of the resulting paper, $W_{CIE}$, of 97.7, the pulp stirred for a further 15 minutes and then treated with 0.15 parts of Aquapel™ 315D (sizing agent). Following a contact time of 30 seconds, 0.005 parts of Percol™ 155 (retention agent) are added, the mixture diluted to 700 parts with tap water and a 10 g sample of paper is produced. After drying, the brightness ($B_{ISO}$), degree of whiteness ($W_{CIE}$) and relative hue angle of the respective shadings are determined.

The results, Examples 29-55 are summarized in the following Table 4:

TABLE 4

| Example No. | Compound No. | Quantity of Dye (g/ton) | $B_{ISO}$ | $W_{CIE}$ | Relative Hue Angle |
|---|---|---|---|---|---|
| 29 | (101) | 131.9 | 82.4 | 97.7 | 285.9 |
| 30 | (102) | 16.1 | 82.6 | 97.7 | 287.0 |
| 31 | (103) | 37.7 | 82.4 | 97.7 | 289.0 |
| 32 | (104) | 66.6 | 82.1 | 97.7 | 286.9 |
| 33 | (105) | 34.0 | 82.3 | 97.7 | 286.9 |
| 34 | (106) | 42.4 | 81.6 | 97.7 | 294.6 |
| 35 | (107) | 42.6 | 82.7 | 97.7 | 287.8 |
| 36 | (108) | 30.6 | 82.9 | 97.7 | 285.1 |
| 37 | (109) | 31.8 | 82.8 | 97.7 | 276.1 |
| 38 | (110) | 45.9 | 82.6 | 97.7 | 283.0 |
| 39 | (111) | 49.4 | 81.8 | 97.7 | 280.6 |
| 40 | (112) | 53.8 | 82.3 | 97.7 | 285.4 |
| 41 | (113) | 51.7 | 82.5 | 97.7 | 277.7 |
| 42 | (114) | 30.9 | 81.4 | 97.7 | 293.0 |
| 43 | (115) | 72.8 | 81.4 | 97.7 | 296.4 |
| 44 | (116) | 51.6 | 80.9 | 97.7 | 294.8 |
| 45 | (117) | 43.4 | 81.5 | 97.7 | 277.7 |
| 46 | (118) | 60.0 | 81.5 | 97.7 | 278.0 |
| 47 | (119) | 57.1 | 81.7 | 97.7 | 279.1 |
| 48 | (120) | 46.3 | 82.0 | 97.7 | 280.0 |
| 49 | (121) | 60.7 | 81.7 | 97.7 | 281.7 |
| 50 | (122) | 51.3 | 82.0 | 97.7 | 278.5 |
| 51 | (123) | 49.1 | 80.8 | 97.7 | 281.0 |
| 52 | (124) | 55.5 | 80.8 | 97.7 | 282.8 |
| 53 | (125) | 62.6 | 81.0 | 97.7 | 284.9 |
| 54 | (126) | 47.8 | 80.8 | 97.7 | 288.7 |
| 55 | (127) | 62.3 | 80.7 | 97.7 | 284.3 |

In a further series of experiments, Examples 56-62, mixtures of the above dyes were used to produce shaded papers. The results are summarized in the following Table 5:

TABLE 5

| Example No. | Compound Nos. | Ratio of Components | $B_{ISO}$ | $W_{CIE}$ | Relative Hue Angle |
|---|---|---|---|---|---|
| 56 | (102) + (111) | 1.1 | 82.2 | 97.7 | 287.4 |
| 57 | (103) + (111) | 1:1 | 82.1 | 97.7 | 284.8 |
| 58 | (102) + (120) | 1:1 | 82.3 | 97.7 | 283.5 |
| 59 | (105) + (119) | 1:1 | 82.0 | 97.7 | 282.8 |
| 60 | (101) + (111) | 1:2 | 82.0 | 97.7 | 282.4 |
| 61 | (102) + (109) | 1:1 | 82.7 | 97.7 | 281.5 |
| 62 | (110) + (111) | 1:1 | 82.2 | 97.7 | 283.8 |

In a further series of experiments, in addition to the appropriate shading dye, the pulp was treated with 1%, based on the weight of the paper, of the fluorescent whitening agent Tinopal™ UP liquid.

The results, Examples 63-70 are summarized in the following Table 6:

TABLE 6

| Example No. | Compound No. | Quantity of Dye (g/ton) | $B_{ISO}$ | $W_{CIE}$ | Relative Hue Angle |
|---|---|---|---|---|---|
| 63 | (102) | 16.1 | 100.8 | 153.2 | 286.1 |
| 64 | (103) | 37.7 | 100.7 | 153.2 | 286.8 |
| 65 | (105) | 34.0 | 100.6 | 153.3 | 286.1 |
| 66 | (111) | 49.4 | 100.0 | 153.6 | 283.9 |
| 67 | (115) | 72.8 | 99.6 | 153.6 | 289.8 |
| 68 | (120) | 46.3 | 100.5 | 149.8 | 285.1 |
| 69 | (125) | 62.6 | 99.2 | 154.0 | 285.4 |
| 70 | (127) | 62.3 | 98.2 | 154.2 | 285.3 |

The invention claimed is:

1. A compound of the formula

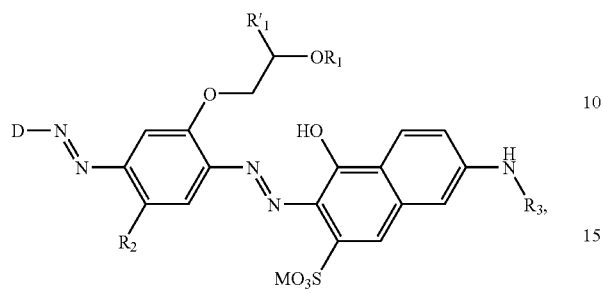

(1)

in which

D represents a phenyl monosulphonic acid residue, which is unsubstituted or substituted by one or two methyl groups or a nitro group, a phenyl disulphonic acid residue, a salicylic acid residue or a naphthalene mono- or disulphonic acid residue, $R_1$ and $R_2$, independently, represent hydrogen or, a $C_1$-$C_4$alkyl group, $R'_1$ represents hydrogen, hydroxyl, $C_1$-$C_4$alkyl or $C_1$-$C_4$hydroxyalkyl, $R_3$ represents hydrogen, $C_1$-$C_4$alkyl or phenyl, which is unsubstituted or substituted by one or two groups selected from $C_1$-$C_4$alkyl, $C_1$-$C_4$alkoxy, halogen, hydroxyl, —$NH_2$, nitro, —$SO_3M$ and —$CO_2M$ and M represents hydrogen, an alkaline or alkaline earth metal, ammonium or ammonium that is mono-, di-, tri- or tetrasubstituted by $C_1$-$C_4$alkyl or $C_2$-$C_4$hydroxyalkyl or a polyglycolammonium cation.

2. A compound according to claim 1 in which, in formula (1), $R_1$ represents hydrogen or methyl, $R'_1$ represents hydrogen, methyl or hydroxymethyl, $R_2$ represents hydrogen or methyl and $R_3$ represents hydrogen, phenyl or an amino phenyl sulphonic acid residue.

3. A process for the preparation of the compound of formula (1), according claim 1, characterized in that a compound of formula D-$NH_2$ is diazotised and coupled with a compound of formula

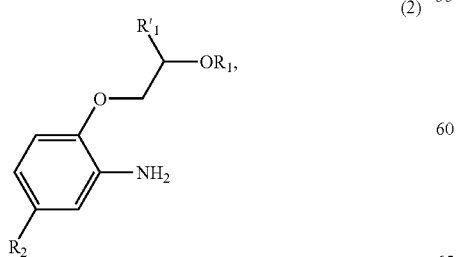

(2)

to yield a compound of the formula

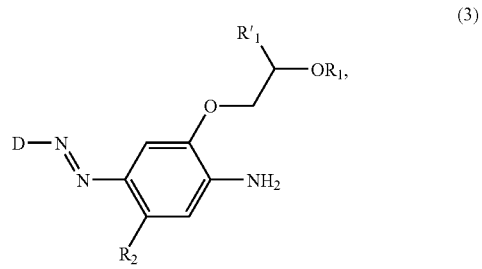

(3)

which is subsequently diazotised and coupled with a compound of the formula

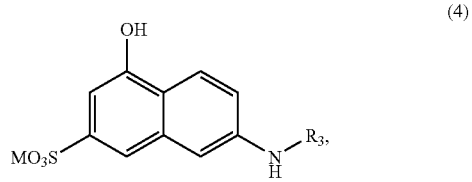

(4)

in which

D, $R_1$, $R'_1$, $R_2$, $R_3$ and M are as defined in claim 1.

4. A process for shading white paper, characterized in that the paper is treated with an amount of between 0.00005 and 0.005%, based on the weight of dried paper, of at least one compound of formula (1) according to claim 1.

5. A process for shading white paper, characterized in that the paper is treated with an amount of between 0.00005 and 0.005%, based on the weight of dried paper, of at least one compound of formula

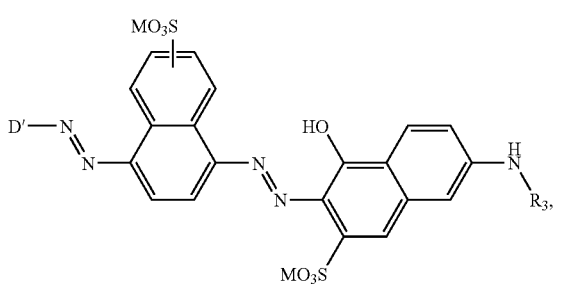

(5)

in which

D' represents a phenyl or naphthalene residue which is substituted by one or two sulphonic acid or carboxylic acid groups and, optionally, by one or two groups selected from $C_1$-$C_4$alkyl and $C_1$-$C_4$alkoxy and $R_3$ and M are as defined in claim 1.

6. A process according to claim 5, characterized in that the shading components comprise a mixture of the compounds of formula

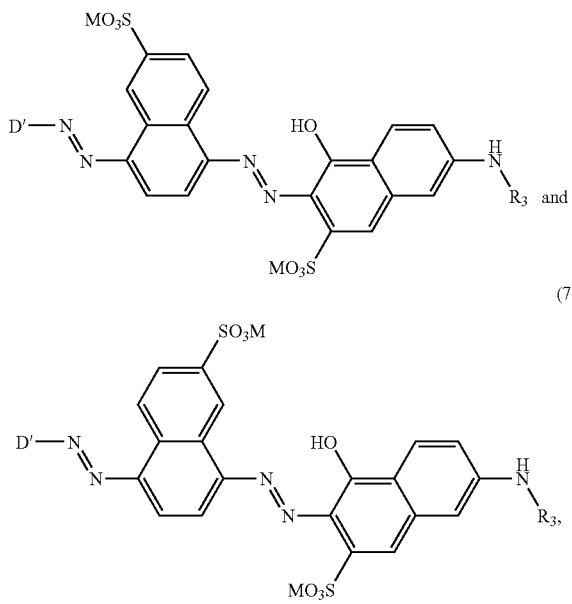

(6)

(7)

in which

D', $R_3$ and M are as previously defined.

7. A process for shading white paper, characterized in that the paper is treated with an amount of between 0.00005 and 0.005%, based on the weight of dried paper, of a mixture comprising at least one compound of formula (1) according to claim 1, together with at least one compound of formula (5),

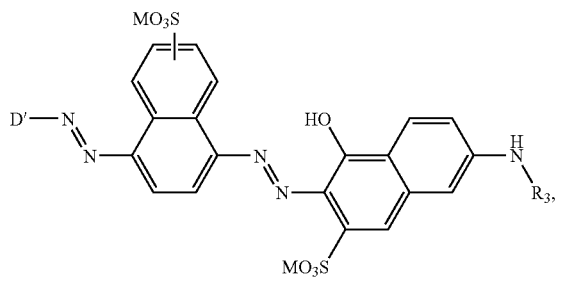

(5)

in which

D' represents a phenyl or naphthalene residue which is substituted by one or two sulphonic acid or carboxylic acid groups and, optionally, by one or two groups selected from $C_1$-$C_4$alkyl and $C_1$-$C_4$alkoxy and $R_3$ and M are as defined in claim 1, whereby the relative ratios of the individual components are such as to result in a hue angle of between 270 and 300°.

8. A solid dye composition for shading white paper, comprising at least one compound of formula (1), according to claim 1,
at least
one compound of formula (5),

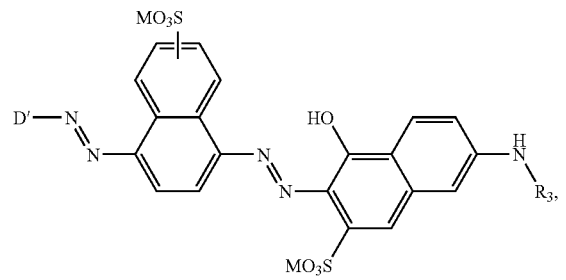

(5)

in which

D' represents a phenyl or naphthalene residue which is substituted by one or two sulphonic acid or carboxylic acid groups and, optionally, by one or two groups selected from $C_1$-$C_4$alkyl and $C_1$-$C_4$alkoxy and $R_3$ and M are as defined in claim 1 and, optionally, further auxiliaries.

9. An aqueous solution for shading paper, comprising at least one compound of formula (1), according to claim 1,
at least one compound of formula (5),

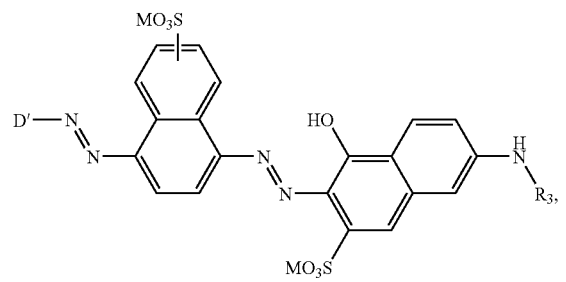

(5)

in which

D' represents a phenyl or naphthalene residue which is substituted by one or two sulphonic acid or carboxylic acid groups and, optionally, by one or two groups selected from $C_1$-$C^4$alkyl and $C_1$-$C_4$alkoxy and $R_3$ and M are as defined in claim 1 and, optionally, further auxiliaries.

10. White paper which has been shaded by a process according to claim 5.

11. White paper which has been shaded by a process according to claim 6.

12. White paper which has been shaded by a process according to claim 7.

* * * * *